Aug. 11, 1931.   J. B. STRAUSS   1,818,824
YIELDING BARRIER FOR VEHICLES
Original Filed Aug. 12, 1922   2 Sheets-Sheet 1
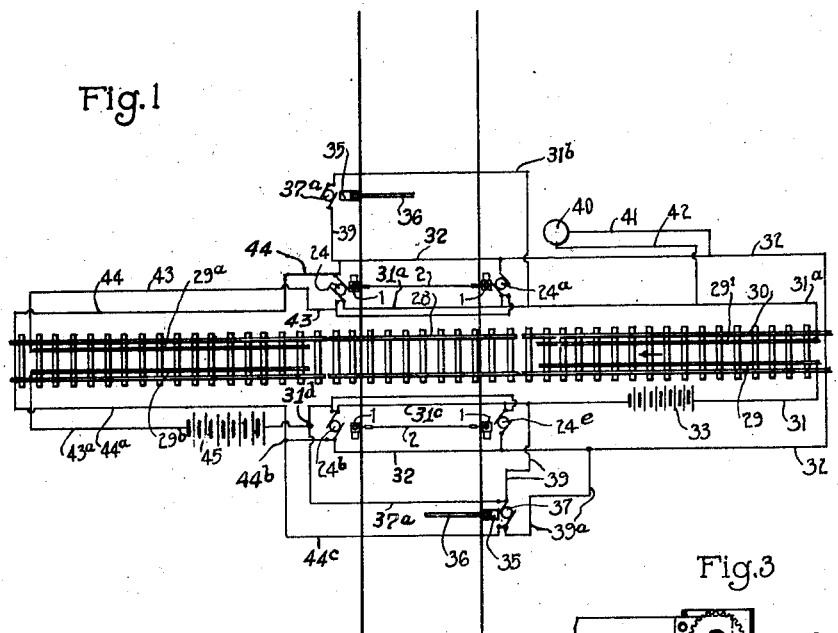
INVENTOR:
JOSEPH B. STRAUSS
By Parker Carter ATTYS.

Aug. 11, 1931.          J. B. STRAUSS                1,818,824
                   YIELDING BARRIER FOR VEHICLES
               Original Filed Aug. 12, 1922     2 Sheets-Sheet 2
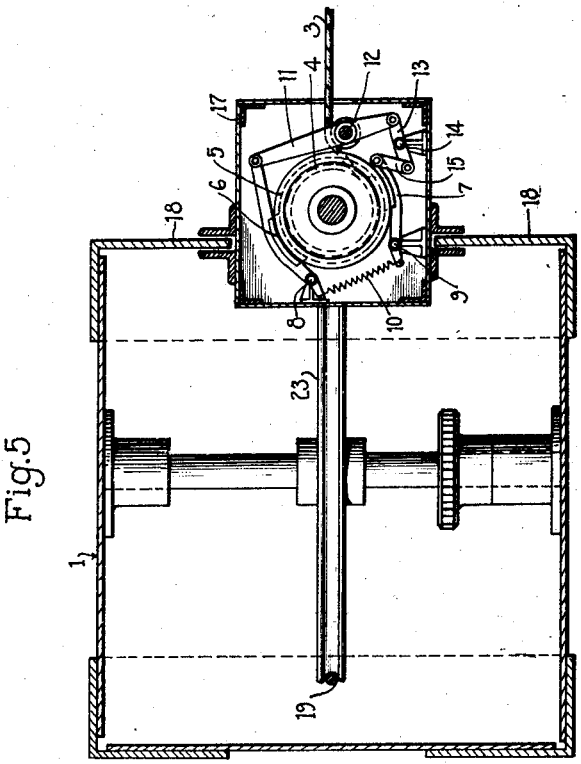
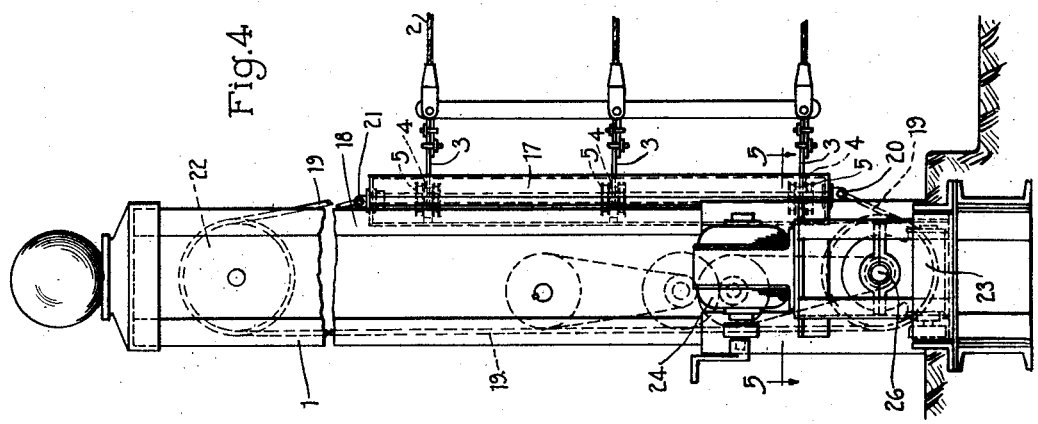
INVENTOR
JOSEPH B. STRAUSS
BY Parker & Carter ATTYS.

Patented Aug. 11, 1931

1,818,824

UNITED STATES PATENT OFFICE

JOSEPH B. STRAUSS, OF CHICAGO, ILLINOIS

YIELDING BARRIER FOR VEHICLES

Original application filed August 12, 1922, Serial No. 581,339, now Patent No. 1,652,186, dated December 13, 1927. Divided and this application filed April 25, 1923. Serial No. 634,478.

This invention relates to yielding barriers for vehicles and has for its object to provide a new and improved barrier adapted to be out of the way when not in use, the device being controlled automatically and when struck by a vehicle gradually stopping it without injuring either the vehicle or the occupants. The invention has other objects which are more particularly pointed out in the accompanying specification.

Referring now to the drawings:

Fig. 1 is a plan view of one form of device embodying the invention.

Fig. 2 is a front elevation of one of the flexible obstructing devices and its associated parts.

Fig. 3 is an enlarged detail view showing the motor connected with the warning signal arm.

Fig. 4 is an enlarged view with parts broken away showing one of the parts and the associated mechanism.

Fig. 5 is a horizontal section taken on line 5—5 of Fig. 4.

Like numerals refer to like parts throughout the several figures. This is a division of my application Serial No. 581,339, filed August 12, 1922, now Patent Number 1,652,186, dated December 13, 1927.

In carrying out my invention I provide posts or supports 1 on opposite sides of the roadway. I also provide a flexible obstructing device 2 which extends between these posts and which can be raised so as to be out of the way and lowered so as to extend across the roadway and be engaged by any vehicle attempting to pass. I prefer to make this flexible obstructing device 2 in the form of a network. The obstructing device 2 has connected to it at each end flexible devices or cables 3. These cables are wound around drums 4 (see Figs. 4 and 5). When the obstructing device is struck by a vehicle, the pressure on it unwinds the cables 3 from the drums and permits the obstructing device to move forward with the vehicle. Some means is provided for resisting this forward movement so as to bring the vehicle to a stop.

In the construction illustrated the drums are provided with suitable retarding devices or brakes which resist their rotation, and these brakes are automatically applied by the pressure of the vehicle on the obstructing device. One form of the brake is illustrated in Figs. 4 and 5. In this construction the drums 4 are provided preferably at both ends with the brake drums 5. Engaging these brake drums are the braking elements 6 and 7, pivoted at 8 and 9, and provided with the retracting spring 10.

Means is provided for clamping these brake elements on the brake drum when the obstruction device is struck by the vehicle. One mechanism for this purpose is illustrated, wherein the brake element 6 has connected therewith a pivoted member 11 which has a guide 12 over which the cable 3 passes. The member 11 is pivoted to the lever 13, the lever being pivoted at 14 between its ends and being also connected with a link 15 which is pivoted to the brake member 7. All of the drums are preferably provided with this arrangement.

It will be seen that when the obstructing device is struck by the vehicle and the cables 3 begin to pay out, there will be a pressure applied to the guide 12, and hence to the pivoted member 11, tending to pull it toward the lever 13. This clamps the brake member 6. The pressure of the pivoted member 11 on the lever 13 rocks it about its pivot 14, and by means of the links 15 clamps the brake member 7 on the brake drum. It will thus be seen that this braking action is automatic and that the greater the pressure, the greater the braking action will be. It will further be seen that this construction permits the obstructing device to gradually move under the impact of the vehicle, and that it will be gradually stopped so as to stop the vehicle without injuring it or the passengers.

Some suitable means is provided for retracting the drums 4 when the pressure from the obstructing device is relieved. This retracting device may consist of a retracting spring. The drums 4 and the braking apparatus on each post are carried by a sliding part 17 which slides along the sides 18 of the post, as clearly illustrated in Fig. 5. This sliding part is operated by some suitable mechanism so that the obstructing device can be lifted out of the way and lowered across the roadway when desired.

In the construction shown this lifting mechanism comprises a cable 19 which has its ends connected to the sliding device, as shown at 20 and 21 (see Fig. 4). This cable passes over the pulleys 22 and 23 at the top and bottom of the posts.

A suitable motor 24 is provided, the motor being connected by suitable gearing 25 with the shaft 26 of the driving pulley 4 (see Fig. 4). It will thus be seen that when the motor is rotated in one direction, the sliding devices, drums and brakes will be moved up so as to move the obstructing device out of the way, as shown in dotted lines in Fig. 1 and that when the motor is rotated in the other direction the sliding devices, drums and brakes will be moved downwardly so as to move the obstructing device across the roadway.

In the present construction I arrange mechanism for automatically lifting and lowering the obstructing device 2, such obstruction being automatically lowered before the train and being automatically raised after the train passes the crossing.

I also prefer to provide a warning device for drivers of vehicles on the road and also an indicating device which indicates to the engineer of the train as to whether or not the device is operating. I have shown diagrammatically such an arrangement in Fig. 1. In this figure I have shown the yielding obstructing device on opposite sides of the crossing of the track 28. Along the track I provide the conducting rails 29 and 29' 29a and 29b, which are insulated from the ground. They are shown as resting on the wood ties 30. These rails are illustrated diagrammatically, and it is understood that in practice they will be so positioned that a train will not be on the two sets of rails on opposite sides of the crossing, at one time, that is, so that the train will not connect these two sets of rails.

When a train which may be made of several cars or one car is moving in the direction of the arrow in Fig. 1 and comes in contact with the rails 29 and 29' a circuit is completed by the train between the conductors 31 and 31a. The circuits are then traced as follows—from source of electric supply 33 along conductor 31, thence through the train to conductor 31a to the conductor 31b where the current divides, a part of the current continues along conductor 31a and then passes through motor 24a to conductor 32. Another portion of the current passes through motor 24 to conductor 32, a portion of the current from conductor 38 passes through conductor 31b and thence to the motor 37a and conductors 39 to conductor 44, where it joins the current through the other two motors. The current then proceeds along conductor 44 to conductor 44a to the point 44b where it again divides, a portion of the current passing through the motor 24b to the conductor 31c, and a portion of the current passing through conductor 32 and thence through the motor 24e to conductor 31c and thence back to the source of electric supply 33. Another portion of the current passes from the point 44b along conductor 44c thence through electric motor 37 and conductor 39 to conductor 31 and the source of electric supply 33. All the electric motors are set in operation in one direction so as to act to positively move the obstructing devices on each side of the railway, down to their operative positions and to move the arms 36 down to their operative positions, at the same time a portion of the current passes from conductor 31a through conductor 42, signal 40 and conductor 41 back to conductor 32 and then takes the same path heretofore described thus actuating the signalling device. When the train passes from the rails 29 and 29' to the rails 29a and 29b the circuit heretofore completed is broken and another circuit is completed between the ends of the conductors 43 and 43a connected with the rails 29a and 29b. The current then travels through all these motors in the opposite direction and they are actuated to positively lift the obstructing devices 2 and the arms 36 from the source of electric supply 45 to conductor 43a to the train thence through conductor 43 to the motor 24 where the current divides and where a portion goes through motor 24 to conductor 32 and another portion passes along conductor 31a to motor 24a and thence to conductor 32. Another portion of the current passes from the conductor 31a to conductor 31b and then through motor 37a and conductor 39 to conductor 32. The current then passes along conductor 32 across the track until it reaches conductor 39a where it divides a portion passing along conductor 32 and then through motor 24e and conductor 31c to the point 31d and then the source of electric supply 45. Another portion passes along conductor 32 and thence through motor 24b to the point 31d and source of supply 45. Another portion of the current passes through conductor 39a to motor 37 thence through conductor 37a to the point 31d and thence to the source of electric supply 45. It will be seen that the current is now passing through these motors in the opposite direction and the motors are arranged so that when this happens they rotate in the opposite direction to that hereinbefore described so that they positively lift the obstructing devices 2 and the arms 36 to their inoperative position. When the train leaves the rails 29a and 29b the circuit between conductors 43 and 43d is broken. It will further be seen that since the obstructing device 2 moves bodily downward and the warning arms 36 do not move bodily downward but around a pivot, this makes a vivid and complete impression of the two devices on the eye of the party coming along the road in an automobile, whereas if they were both pivoted he might think they were practically the same thing. This indication to him that there are two distinct and different things in front of him tends to make such an impression before him that he will slow up his automobile and if he does strike the obstructing device 2 it will be with less force than might otherwise be the case. It will further be seen that the obstructing devices 2 are moved down to their operative positions positively and directly by the train and wholly independent of their weight and that they would be moved downwardly not only if the weight was removed but if there was an obstruction in the way which resisted the downward movement so that the downward movement of the obstructing devices to their operative positions is assured under all conditions and this is the vitally important thing with such a barrier. If it is moved down to its operative position positively and without fail, it will stop the automobile and save the lives. It will also be seen that in this construction the same motors which are used to positively lower the obstructing devices are also used for lifting them to their inoperative positions.

I claim:

1. A yielding barrier for car crossings comprising an obstructing device at a distance from the crossing, said obstructing device being provided with separated posts and having a sliding connection at each end with said posts and adapted to be bodily lifted and lowered so as to move it to an operative or inoperative position, an upstanding device at a distance along the roadway in front of the obstructing device, an arm carried thereby and supported at one end thereon, flexible dependent strips connected at intervals along said arm, said arm adapted to be moved across the roadway when the obstructing device is lowered across the roadway so as to warn the operator of the approaching vehicle that the obstructing device is lowered and means directly actuated by the train for positively and conjointly moving both said obstructing device and arm to their operative and inoperative positions, the obstructing device moving downwardly past said arm when they are both moved to their operative positions.

2. A yielding barrier for car crossings comprising an obstructing device at a distance from the crossing, means directly actuated by the train for both bodily and positively lifting and lowering said obstructing device so as to move it to an operative or inoperative position, an upstanding device at a distance along the roadway in front of the obstructing device, an arm carried thereby and pivoted at one end thereto being positively and directly actuated by the train, flexible dependent strips connected at intervals along said arm, and means for swinging said arm across the roadway when the obstructing device is lowered across the roadway so as to warn the operator of the approaching vehicle that the obstructing device is lowered, said arm and the means for lifting and lowering the obstructing device being simultaneously and automatically actuated by the car the obstructing device moving downwardly past said arm when they are both moved to their operative positions.

3. A protecting device for road way grade car crossings comprising a yielding obstructing device extending across the roadway and slidably mounted so that it may be bodily lifted to an inoperative position and lowered to an operative position and positively acting means directly actuated by the train for automatically lowering said obstructing device independent of its weight to its operative position as the train approaches the crossing and for automatically lifting the obstructing device to its inoperative position after the train passes the crossing.

4. A protecting device for roadway grade car crossings comprising supports at opposite sides of the roadway, a yielding obstructing device having its ends slidably connected with said supports and means at each end thereof directly actuated by the train as it approaches the crossing for positively lowering both ends of said obstructing device so as to move it to its operative position across the roadway and for lifting both ends of said obstructing device after the train passes the crossing so as to lift the obstructing device to its inoperative position, the said lowering means for said obstructing device also acting as the lifting means therefor.

Signed at Chicago, county of Cook and State of Illinois, this 19th day of April, 1923.

JOSEPH B. STRAUSS.